March 12, 1957 P. PANHARD 2,784,609
TEN SPEED GEAR BOX BUILT WITH NINE TOOTHED WHEELS
Filed Sept. 1, 1953
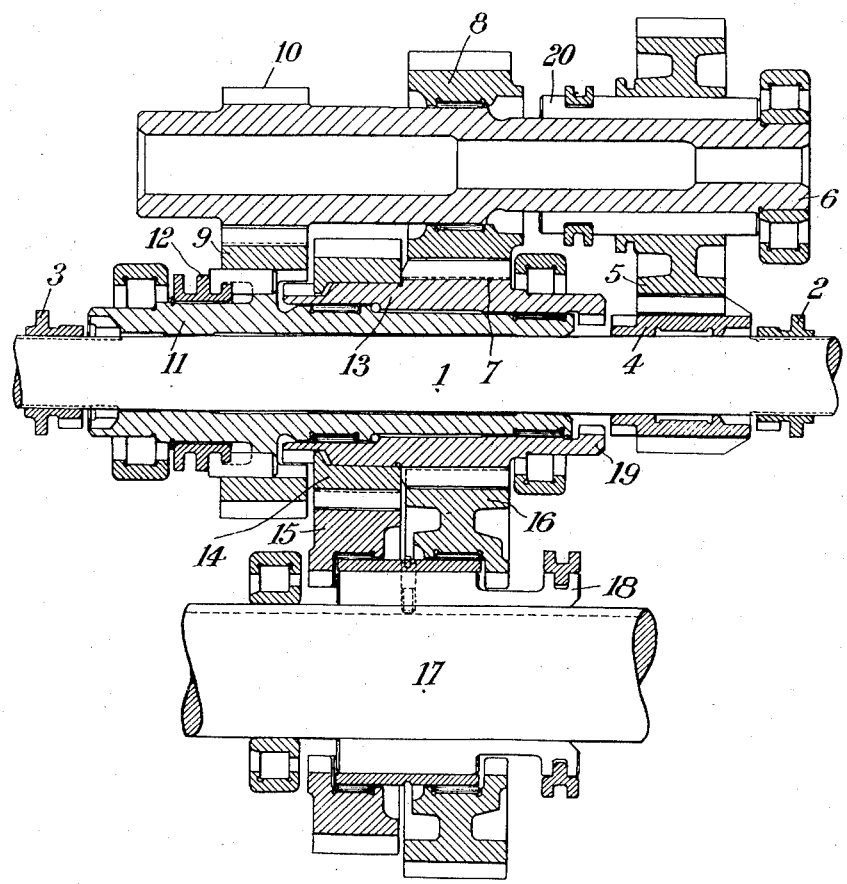

United States Patent Office 2,784,609
Patented Mar. 12, 1957

2,784,609

TEN SPEED GEAR BOX BUILT WITH NINE TOOTHED WHEELS

Paul Panhard, Paris, France, assignor to Société Anonyme des Anciens Etablissements Panhard & Levassor, Paris, France Application September 1, 1953, Serial No. 377,897

Claims priority, application France, September 3, 1952

6 Claims. (Cl. 74—359)

In some vehicles intended to operate on all types of grounds the stresses on the wheels vary in considerable proportions. It is necessary, therefore, to equip them with a gear box in which the difference between the lowest and highest gear speeds is very high for allowing operation in extreme conditions and it is desirable to have available a large number of intermediate speeds for utilizing the engine in all cases under the best conditions. Thus for vehicles of the "all grounds" type one may be led to making a ten speed gear box, the demultiplication ratio between the first and the tenth being about 22. If it is desired to realize such a gear box by conventional methods, one is led to using two toothed wheels for each speed, i. e. twenty toothed wheels, which gives a bulky, heavy and costly assembly.

An object of the present invention is a particular arrangement combining the toothed wheels in such a manner that nine gear wheels are sufficient for obtaining the ten speeds, which means a gain of more than half the toothed wheels as compared with conventional boxes, resulting in considerable decreases in volume, weight and cost for the box. The combination consists essentially; on the one hand in using in two converse manners a number of wheel pairs gearing together in such a manner that while giving a ratio $$\frac{1}{n}$$

or $n$ in one case they give a ratio $n$ or $$\frac{1}{n}$$

in the second case, and, on the other hand, in having the gear box output either comprised of a first pair of wheels gearing together with a ratio $$\frac{1}{p}$$

or a second output pair with a ratio $$\frac{1}{p\sqrt{n}}$$

The combination also comprises the arrangement of driving dogs and spindles giving, for each speed the selection of driving wheels and for each multiplying or de-multiplying wheel pair the direction in which it should be connected. These principles will appear more clearly from the example of embodiment described hereinafter:

The gear box is represented in a single view, which is a section through the plane of the three axes about which the toothed wheels rotate. The driving shaft 1, which goes through the box, comprises two sets of dogs 2 and 3, one at the input to the box, the other one at the output therefrom. The dogs 2 make it possible to actuate the pair of toothed wheels 4, 5 with a ratio $$\frac{1}{2}$$

On the shaft 6 of the large wheel 5 of the pair 4, 5, there is also a wheel 8 gearing with a wheel 7 equal in diameter, and dog members 20 make it possible to associate this wheel 8 at will with the shaft 6. The small wheel 10 of a wheel pair 9, 10, with a ratio $$\frac{2}{1}$$

is integral with shaft 6.

The driving shaft 1 is surrounded with a concentric hollow shaft 11 which may be driven at will by the driving shaft 1 through the dogs 3. Looking from left to right it will be seen that the large wheel 9 of the pair 9, 10, with a ratio $$\frac{2}{1}$$

is integral with hollow shaft 11, and that this wheel drives the dog members with their control 12. These dog members make it possible, when desired, to associate with the hollow shaft 11 a second co-axial hollow shaft 13.

The shaft 13 is rigidly secured to the small wheel 14 of a wheel pair 14, 15 with a ratio $$\frac{1}{1.33}$$

and with the first wheel 7 gearing with the wheel 8 equal in diameter. This wheel 7 secured on the tubular shaft 13 forms, on the other hand, a demultiplying pair with a ratio $$\frac{1}{\sqrt{2}} \times \frac{1}{1.33}$$

with the wheel 16 of a larger diameter, with which it gears.

The wheels 15 and 16 are associated, at will, with the box output shaft 17 by means of dog spindles with a control 18. Finally, at the right end of the hollow shaft 13 is a dog arrangement 19 making it possible, at will, to associate said shaft 13 with the small wheel 4 of the pair 4, 5.

It appears from the above description that the gear box thus set up, comprising the two pairs of toothed wheels 4, 5 and 9, 10 the two pairs 14, 15 and 7, 16 and the wheel 8, comprises in all nine toothed wheels.

The couplings giving the ten speeds are defined in the following table in which the first column shows the successive passage points of the driving torque, dogs and wheel pairs, with their ratios, from the entrance into the box to the output therefrom, and the second column the ratio of the output speed to the input speed in the box.

| Passage points of the driving torque and wheel pair ratio | | | Speed ratio | Speed |
|---|---|---|---|---|
| dog 2, pair 4, 5 (ratio $\frac{1}{2}$) | dog 12, pair 10, 9 (ratio $\frac{1}{2}$) | (pair 7, 16 ratio $\frac{1}{\sqrt{2 \times 1.33}}$) | $\frac{1}{2} \times \frac{1}{2} \times \frac{1}{\sqrt{2 \times 1.33}} = \left(\frac{1}{\sqrt{2}}\right)^5 \times \frac{1}{1.33}$ | 1st |
| | | (pair 14, 15 ratio $\frac{1}{1.33}$) | $\frac{1}{2} \times \frac{1}{2} \times \frac{1}{1.33} = \left(\frac{1}{\sqrt{2}}\right)^4 \times \frac{1}{1.33}$ | 2nd |
| dog 2, pair 4, 5 (ratio $\frac{1}{2}$) | dog 20, pair 8, 7 (ratio $\frac{1}{1}$) | (pair 7, 16 ratio $\frac{1}{\sqrt{2 \times 1.33}}$) | $\frac{1}{\sqrt{2}} \times \frac{1}{1} \times \frac{1}{2 \times 1.33} = \left(\frac{1}{\sqrt{2}}\right)^3 \times \frac{1}{1.33}$ | 3rd |
| | | (pair 14, 15 ratio $\frac{1}{1.33}$) | $\frac{1}{2} \times \frac{1}{1} \times \frac{1}{1.33} = \left(\frac{1}{\sqrt{2}}\right)^2 \times \frac{1}{1.33}$ | 4th |
| dog 3 | dog 12 | (pair 7, 16 ratio $\frac{1}{\sqrt{2 \times 1.33}}$) | $1 \times \frac{1}{\sqrt{2 \times 1.33}} = \frac{1}{\sqrt{2}} \times \frac{1}{1.33}$ | 5th |
| | | (pair 14, 15 ratio $\frac{1}{1.33}$) | $1 \times \frac{1}{1.33} = 1 \times \frac{1}{1.33}$ | 6th |
| dog 3, pair 9, 10 (ratio 2) | dog 20, pair 8, 7 (ratio $\frac{1}{1}$) | (pair 7, 16 ratio $\frac{1}{\sqrt{2 \times 1.33}}$) | $2 \times \frac{1}{\sqrt{2 \times 1.33}} = \sqrt{2} \times \frac{1}{1.33}$ | 7th |
| | | (pair 14, 15 ratio $\frac{1}{1.33}$) | $2 \times \frac{1}{1.33} = (\sqrt{2})^2 \times \frac{1}{1.33}$ | 8th |
| dog 3, pair 9, 10 (ratio 2) | dog 19, pair 5, 4 (ratio 2) | (pair 7, 16 ratio $\frac{1}{\sqrt{2 \times 1.33}}$) | $2 \times 2 \times \frac{1}{\sqrt{2 \times 1.33}} = (\sqrt{2})^3 \times \frac{1}{1.33}$ | 9th |
| | | (pair 14, 15 ratio $\frac{1}{1.33}$) | $2 \times 2 \times \frac{1}{1.33} = (\sqrt{2})^4 \times \frac{1}{1.33}$ | 10th |

The operation of the box in all cases appears from the reading of this table, which is immediate. For instance, in the case of the first speed it will be seen, with reference to the first line under the headings of said table that the control of the dog 2 associates in rotation with the driving shaft 1 the toothed wheel 4 which, by gearing with the wheel 5 associated with the shaft 6 drives this shaft in rotation at a speed equal to half that of the driving shaft. The toothed wheel 10 associated with this shaft 6 drives the toothed wheel 9 associated with the tubular shaft 11 and this tubular shaft itself at a rotation speed equal to one fourth of that of the driving shaft. The dogs 12 drive, at the rotation speed of this first tubular shaft 11 the second tubular shaft 13 and its two toothed wheels 14 and 7 which gear respectively with the toothed wheels 15 and 16. By suitably operating the control 18, it is the larger one, 16, of these two latter wheels which is associated with the output shaft 17 which is thus driven at a speed equal to $$\frac{1}{2} \times \frac{1}{2} \frac{1}{\sqrt{2 \times 1.33}} \left(\frac{1}{\sqrt{2}}\right)^5 \frac{1}{1.33}$$

times that of the driving shaft.

It is obvious that, in the above description and table, 2 could be replaced by $n$ and 1.33 by $p$ and that all gear boxes built on the basis of any pair of values for $n$ and $p$ are within the scope of the invention.

What I claim is:

1. A gear box with multiple speed ratios comprising, in combination, an input structure including a driving shaft, an auxiliary shaft parallel to the driving shaft, a plurality of axially-aligned first pinions mounted coaxially with said driving shaft and adapted for rotation therewith, a like number of axially-aligned second pinions mounted coaxially with said auxiliary shaft and adapted for rotation therewith, said second pinions forming with said first pinions a like number of pinion pairs in each of which the two pinions are interengageable with each other, and an output structure including a driven shaft parallel to said driving shaft and said auxiliary shaft, at least one third pinion mounted coaxially with said driven shaft and adapted for rotation therewith and forming with at least one of said first pinions at first one pinion pair, with the two pinions of the last-named pinion pair adapted to inter-mesh, the first pinion in said last-named pinion pair thereby serving as a drive wheel for the driving shaft, and said first pinion forming said last-named pinion pair being disposed for rotation with said driving shaft axially inwardly of the axially-outermost pinions rotatable with said driving shaft.

2. A gear box with multiple speed ratios comprising, in combination, an input structure including a driving shaft, an auxiliary shaft parallel to the driving shaft, three axially-aligned first pinions mounted coaxially with said driving shaft and adapted for rotation therewith, three axially-aligned second pinions mounted coaxially with said auxiliary shaft and adapted for rotation therewith, said second pinions forming with said first pinions three pinions pairs including two axially-outer pairs and an intermediate pair in each of which the two pinions are permanently intermeshed, the pinions of the intermediate pair being of like diameter, and an output structure including a driven shaft parallel to said driving shaft and said auxiliary shaft, at least one third pinion mounted coaxially with said driven shaft and adapted for rotation therewith and forming with the intermediate first pinion a pinion pair, with the two pinions of the last-named pinion pair intermeshed, the first pinion in said last-named pinion pair thereby serving as a drive wheel for the output structure.

3. A gear box with multiple speed ratios comprising, in combination, an input structure including a driving shaft, an auxiliary shaft parallel to the driving shaft, three axially-aligned first pinions mounted coaxially with said driving shaft and adapted for rotation therewith, three axially-aligned second pinions mounted coaxially with said auxiliary shaft and adapted for rotation therewith, said second pinions forming with said first pinions three pinion pairs including two axially-outer pairs and an intermediate pair in each of which the two pinions are permanently intermeshed, and a fourth first pinion mounted coaxially with said driving shaft and adapted for rotation therewith, said fourth first pinion being fixed for rotation with the first pinion of said intermediate pair, and an output structure including a driven shaft parallel to said driving shaft and said auxiliary shaft, two third pinions mounted coaxially with said driven shaft and adapted for rotation therewith and forming with said fourth first pinion and the pinion of the intermediate pair two pinion pairs, with the two pinions of the last-named pinion pairs permanently intermeshing, the first pinions in said last-named pinion pairs thereby serving as drive wheels for the output structure.

4. A gear box as defined in claim 3 wherein the axially-outer of the first pinions are of different diameters and the one of greater diameter has a tubular extension mounted co-axially on the driving shaft and extending towards the axially-outer first pinion of lesser diameter, rolling elements mounted around said extension and a sleeve mounted around said rolling elements, the drive wheels of the output structure being rigidly mounted on said sleeve.

5. A gear box as defined in claim 3 wherein the speeds of rotation at which the drive wheels of the output structure are driven are stepped in geometric progression according to a certain ratio and the rates of multiplication of the two pairs of pinions formed by the driving pinions of the input structure and the two gears of the output structure are mutually in a ratio equal to the square root of the above ratio so that the speeds of the gear box are regularly stepped, from the lowest to the highest in a geometric progression of ratio equal to this square root.

6. A gear box with nine toothed wheels giving ten different speeds, comprising an input shaft, an intermediate shaft, an output shaft, a pair of toothed wheels in gear with a ratio $$\frac{1}{n}$$

the first wheel of said pair being coaxial with the input shaft and the second wheel of said pair being keyed on the intermediate shaft, a second pair of toothed wheels in gear with a ratio $n$, the first wheel of said second pair being coaxial with the input shaft and the second wheel of said second pair being keyed on the intermediate shaft, a third pair of toothed wheels in gear with a ratio $$\frac{1}{p}$$

the wheels of said third pair being a first wheel and a second wheel coaxial respectively with the input shaft and the output shaft, a fourth pair of toothed wheels in gear with a ratio $$\frac{1}{p}\frac{1}{\sqrt{n}}$$

the wheels of said fourth pair being a first wheel and a second wheel respectively coaxial with the input shaft and the output shaft, a ninth toothed wheel rotatably mounted on the intermediate shaft and having the same diameter as the first toothed wheel of the fourth pair, and in gear therewith, a hollow shaft rotatably mounted on the input shaft and rotatable with the first toothed wheel of the second pair, a second hollow shaft rotatably mounted on the input shaft and rotatable with the first toothed wheels of the third and fourth pairs, and means for connecting in rotation the first toothed wheel of the first pair with the input shaft, the first hollow shaft with the input shaft, the ninth toothed wheel with the intermediate shaft, the two hollow shafts with one another, the first toothed wheel of the first pair with the second hollow shaft, and one of the second wheels of the third and fourth pairs with the output shaft.

References Cited in the file of this patent
UNITED STATES PATENTS

| | | |
|---|---|---|
| 1,242,678 | Gibson | Oct. 9, 1917 |
| 1,859,171 | Riley | May 17, 1932 |
| 2,306,545 | Kummich | Dec. 29, 1942 |
| 2,329,354 | McCarter | Sept. 14, 1943 |
| 2,543,412 | Kegresse | Feb. 27, 1951 |